Feb. 18, 1958 G. SWIFT 2,824,236
SENSITIVITY ADJUSTMENT FOR RADIOACTIVITY WELL LOGGING
Filed May 10, 1954 2 Sheets-Sheet 1

INVENTOR.
GILBERT SWIFT
BY
Robert K. Schumacher
ATTORNEY

Feb. 18, 1958 G. SWIFT 2,824,236
SENSITIVITY ADJUSTMENT FOR RADIOACTIVITY WELL LOGGING
Filed May 10, 1954 2 Sheets-Sheet 2

INVENTOR.
GILBERT SWIFT
BY
Robert K. Schumacher
ATTORNEY

United States Patent Office 2,824,236
Patented Feb. 18, 1958

2,824,236

**SENSITIVITY ADJUSTMENT FOR RADIO-
ACTIVITY WELL LOGGING**

Gilbert Swift, Tulsa, Okla., assignor to Well Surveys, Incorporated, a corporation of Delaware Application May 10, 1954, Serial No. 428,411

11 Claims. (Cl. 250—83.6)

This invention relates to method and apparatus for adjusting the sensitivity of an indicating or recording system and determining the adjustment thereof, said system including a control that adjusts the sensitivity of said apparatus.

The invention will be particularly described with relation to a well logging device. In such apparatus, a housing containing the detecting equipment is lowered by a cable into the bore hole. The electrical response from the equipment is conveyed to the surface where it is recorded as an indication of the character of the formations surrounding the bore hole. The amount of cable paid out is correlated with the electrical response to give a log of the bore hole. It is a necessary requisite in such logging equipment that the response be compared to some standard so that the log record can be compared to this standard. For instance, in a radioactivity well logging system, a known standard amount of radio-activity is placed in the vicinity of the detector and the amount of response noted. The sensitivity of the system is the amount of response to the stimulus of standard radiation. To illustrate, let it be assumed that the record is made by a pen on a moving paper strip, the longitudinal movement of the strip being controlled by the paying out of cable to lower the detector in the bore hole. Let it further be assumed that for the standard stimulus of amount S the pen travels laterally 5 inches across the strip of paper. If the detector is lowered into the bore hole and, at some depth there occurs 5 inches of pen travel, it is known that the radiation intensity at that depth is equal to S. If at some depth there is obtained only 2½ inches of travel, it is known that there is a radiation intensity at that level of about ½ S. Let it further be assumed that the paper strip is 10 inches in width thereby permitting only 10 inches of pen travel. Under these circumstances, if the radiation intensity at some depth were 3S, the pen would go off the paper, and such intensity could not be recorded. To prevent this the sensitivity is reduced, for instance, to ½ that which was employed when recording the standard. Then 3S intensity would give 7½ inches of pen travel. Under some other circumstances it might be necessary to increase the sensitivity. Therefore, the logging equipment includes a means to adjust the sensitivity of the recording elements to accommodate all such circumstances. This invention has to do with this means of adjusting the sensitivity of the recording elements. In particular, this invention relates to method and apparatus for adjusting this means and for determining the adjustment thereof.

Given a system of which the sensitivity may be increased or decreased at will by adjusting at least one parameter (such as, for example, resistance), it is necessary first to determine the relationship between the sensitivity of the system and the magnitude of this parameter. Then a sensitivity control unit is provided which can vary said parameter as a function of the position of an indicating member such that at equal increments of position the sensitivity varies by equal ratios. (In a system of which the sensitivity is proportional to a resistance this control may be a logarithmically wound variable resistor operated by a rotatable shaft to which a pointer is attached.) There is then a logarithmic relationship between sensitivity and indicating member position. A movable logarithmically graduated scale, against which the position of the indicating member can be read, is arranged with respect to the indicating member in such a way that any part of the scale may be placed at any given position of the indicating member.

In use, the sensitivity of the system is tested, as by applying a known standard stimulus and observing the response of the system thereto. The scale is moved with respect to the indicating member until the reading of the scale coincides with the sensitivity as thus determined, and the scale is fixed in that position. Thenceforth, any change of the setting of the sensitivity control unit will change the position of the indicating member, and the sensitivity corresponding to the new setting of the control unit will be correctly indicated on the scale.

It is therefore an object of this invention to provide method and apparatus for calibrating and adjusting the sensitivity of an electrical measuring apparatus and more particularly of an electrical measuring and recording apparatus such as employed in radioacivity well logging systems.

These and other embodiments of the invention will become apparent from consideration of the accompanying drawings, in which.

Figure 1:
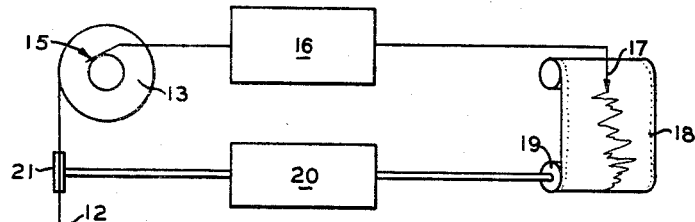
Figure 1 is a diagrammatic illustration of the radioactivity well logging environment in which this invention finds particular utility.

Referring to Figure 1, numeral 10 indicates a housing for the detecting elements which is lowered into the bore hole 11 by cable 12. The cable 12 is operated by power winch 13 to cause the housing 10 to traverse the bore hole and detect radiation from the formations 14 surrounding the bore hole 11. The information is fed up the cable 12 to slip-ring-brush assembly 15 where it is taken off and fed to amplifier-recorder unit 16. The signal resulting from unit 16 operates a stylus 17 which converts these signals into visual indications on the paper strip 18. The feed roller 19 of the strip 18 is connected through gear box 20 to a measuring reel 21 which conveys the movement of the cable 12 to the roller 19. This is the manner in which depth is correlated with detected signal.

Figure 2:
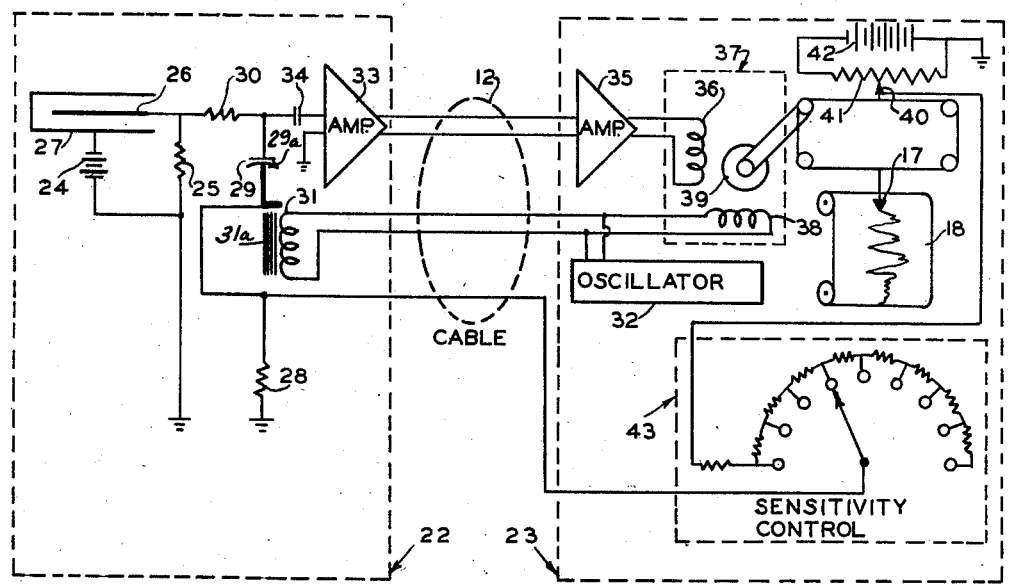
Figure 2 is a functional diagram of a radioactivity well logging system including this invention.

The schematic diagram shown in Figure 2 illustrates the operation of the detecting and recording apparatus of a well logging system. The system includes subsurface apparatus 22 and surface apparatus 23 connected by the logging cable 12. Battery 24 supplies voltage through resistor 25 between inner electrode 26 and outer electrode 27 of a conventional ionization chamber filled with ionizable gas which is ionized by radiation incident thereon. The current flowing between the electrodes is indicative of the radioactivity of the formations explored. The voltage appearing across resistor 25 is, therefore, a measure of the radiation intensity.

The current through the chamber and resistance 25 is measured by a null system. A nulling current from the surface is passed through resistance 28 which is normally $10^{-10}$ as large as resistance 25, therefore requiring $10^{10}$ times as much nulling current as the ionization current. This greater current is easily measured at the surface. The difference between the voltages across resistances 25 and 28 is applied across a periodically varying capacitance 29 through a de-coupling resistance 30. The capacitance 29 is periodically varied by drive coil 31 supplied with voltage by oscillator 32 from the surface of the earth. Drive coil 31 and core 31a periodically attract armature 31b which is rigidly secured to the movable plate 29a of capacitance 29. The connection between armature 31b and plate 29a serves to transfer both electrical and mechanical energy. The periodically varying capacitance changes the D. C. voltage applied thereto to an A. C. voltage which is applied to amplifier 33 through condenser 34. The amplifier is powered from a power supply, not shown, which may be a battery in the subsurface apparatus. The amplified signal is sent to the conventionally powered surface amplifier 35 through conductors of the logging cable 12 and is further amplified and applied to one stator winding 36 of a two-phase motor 37, the other stator winding 38 being connected to oscillator 32 which provides an alternating voltage of constant magnitude thereto. Effectively, therefore, the voltage across capacitance 29 is converted to A. C., amplified and used to rotate rotor 39 of motor 37, the direction of rotation being determined by the phase of this A. C. voltage relative to the voltage of oscillator 32. Since this same voltage from oscillator 32 drives the varying capacitance 29 the relative phase is indicative of whether the voltage across resistance 28 is greater or smaller than that across resistance 25. The rotor 39 is caused to move in such direction as to make the voltage difference smaller by mechanically coupling the rotor 39 to movable contact 40 which moves on slide wire 41. Battery 42 is connected across slide wire 41, and one end thereof is grounded. Current from battery 42 is fed back through sensitivity control 43 down a conductor of cable 12 and through resistor 28, the amount of the current being determined by the position of movable contact 40. This system adjusts itself to provide a nulling current which makes the voltage across resistance 28 equal to that across resistance 25. There then being no voltage across capacitance 29 under this condition, there is then no voltage applied to stator winding 36; hence, the system remains balanced until there is a change in incident radiation, at which time the system re-adjusts itself to balance under the new conditions. Movable contact 40 moves along slide wire 41 to provide the current necessary to produce null. The position of the movable contact is therefore indicative of the ionization current and incident radiation. The movable contact 40 is mechanically coupled to the stylus 17 which records on paper 18 the position of movable contact 40, thus providing a record of incident radiation.

In the system illustrated, the sensitivity may be increased or decreased at the will of the operator by adjustment of one parameter, namely, resistance. If the resistance of slide wire 41 is small compared to the resistance of the sensitivity control circuit, the sensitivity of the system is directly proportional to the resistance of the sensitivity control circuit, and the sensitivity will change in direct proportion to changes in the resistance introduced by the sensitivity control 43. Thus, if the system has a given sensitivity when there is 5,000 ohms resistance in the sensitivity control circuit, the sensitivity is doubled by the introduction of 5,000 ohms more by the sensitivity control 43. For a system in balance for a given sensitivity and radiation, when the sensitivity control 43 is adjusted to double the resistance in the sensitivity control circuit, the system must re-adjust itself to move movable contact 40 to a position on slide-wire 41 providing twice as much voltage, in order that the same nulling current is passed through 28 to balance the system as when the original voltage was applied across half the resistance. Thus, when the sensitivity control doubles resistance, the sensitivity is doubled, i. e., the deflection of stylus 17 is twice as large for a given incident radiation.

Figure 3:
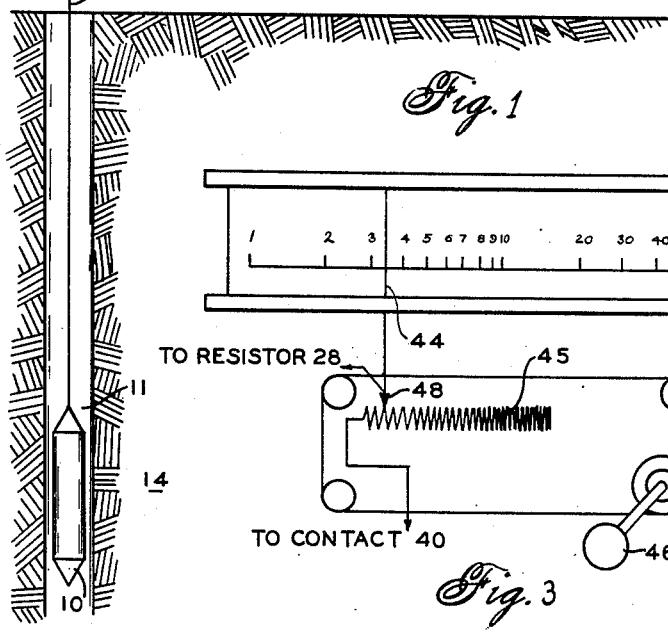
Figure 3 is a diagrammatic illustration of one form of sensitivity control used in connection with the apparatus of Figure 2.

In Figure 3 there is illustrated a sensitivity control unit 43 which may be used in a radioactivity well logging system in which the sensitivity of the system is directly proportional to the resistance of the sensitivity control circuit. In this invention the sensitivity control unit is provided with an indicating member 44 arranged in such a way that equal increments of position vary the sensitivity by equal ratios. Where the sensitivity of a system is directly proportional to the resistance of the sensitivity control circuit, the sensitivity control unit may take the form shown in Figure 3, where resistance 45 is logarithmically wound. When knob 46 is used to move cord 47, to which is fastened movable contact 48, displacement of contact 48 along resistance 45 changes the resistance of the sensitivity control circuit logarithmically and hence varies the sensitivity by equal ratios for equal increments of position. Indicating member 44 is fastened to the movable contact 48 and, therefore, indicates the position of the movable contact. There is then a logarithmic relationship between sensitivity and indicating member position. A transparent movable scale 49 is mounted on tracks 50 on an instrument panel in front of indicating member 44. Movable scale 49 is graduated logarithmically and is movable with respect to the indicating member in such a way that any part of the scale may be placed at any given position of the indicating member. Alternatively, the graduated scale may be fixed and the indicating member may be clamped at various places on cord 47; it is merely required that, with the contact 48 and hence the sensitivity fixed, indicating member 44 and scale 49 be relatively movable.

In use, the sensitivity of the system is first adjusted; for example, a known standard of radiation may be applied, and the sensitivity control may be adjusted to provide for some desired deflection, such as 7 inches. Without changing the adjustment of contact 48, the scale is then moved relative to the indicating member until the reading on the scale coincides with the sensitivity as thus determined (7) and is fixed in that position. Thenceforth, to obtain any particular sensitivity, knob 46 may be adjusted to move indicating member 44 opposite the desired sensitivity, for this simultaneously moves contact 48 to insert the proper resistance in the sensivity control circuit.

Figure 4:
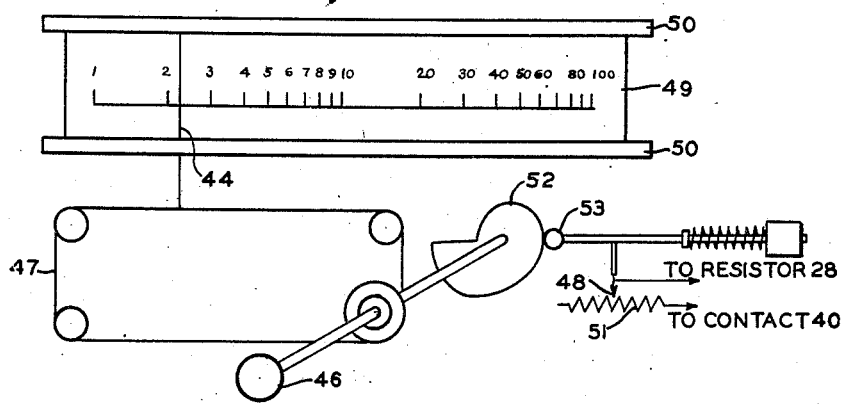
Figure 4 is a diagrammatic illustration of another form of sensitivity control.

In Figure 4 there is illustrated another form of the invention in which resistance 51 is wound linearly. In this embodiment, the logarithmic relationship between the position of indicating member 44 and the resistance in the sensitivity control circuit is supplied by cam 52 and cam follower 53. The cam 52 is shaped in such a fashion as to cause movable contact 48 to move logarithmically upon uniform angular displacement of the cam. Again, for equal increments of indicating member position, sensitivity is changed by equal ratios.

Through the use of differently shaped cams, the apparatus of Figure 4 is adaptable to other types of sensitivity control where sensitivity is not directly proportional to resistance but rather proportional to some other function of resistance or other parameter, e. g., the sensitivity might be inversely proportional to resistance. In such cases, proper shaping of the cam will maintain the logarithmic relationship between the indicating member position and sensitivity, and the same apparatus may be used to adjust the scale with respect to the indicating member so that sensitivity is directly indicated on the scale.

Figure 5:
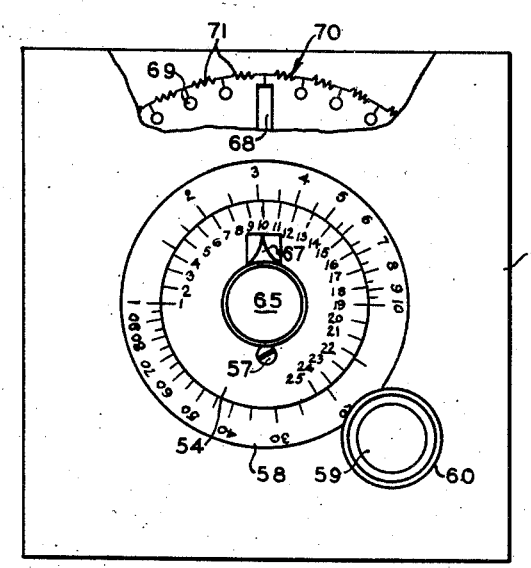
Figure 5 is a top plan view of the calibrator constructed in accordance with this invention, utilizing still another form of sensitivity control.
Figure 6:
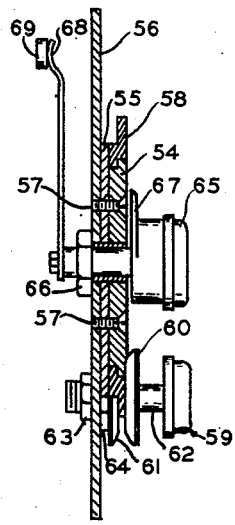
Figure 6 is a side view of the calibrator of Figure 5 partly in section.

In Figures 5 and 6 there is illustrated another embodiment of this invention wherein sensitivity is adjustable by discrete steps. Inner dial 54 is mounted to a plate 55 adjacent to instrument panel 56 and all three are held together by screws 57. An outer dial 58 is mounted to rotate about the inner dial 54. A knob 59 is rotatably mounted on the instrument panel 56 and includes two gripping plates 60 and 61 fixedly mounted to the shaft 62. The shaft 62 is held for rotation only by the nuts 63 and 64. Rotation of the knob 59 rotates the dial 58 about the fixed dial 54.

An indicator knob 65 is carried by a shaft 66. The indicating member 67 of the knob 65 indicates the position of the shaft 66 which passes through registering holes in 54, 55, and 56, and carries at its other end the contact arm 68. Contact arm 68 is rotatable about the axis of shaft 66 to engage contact points 69 which are fixed to particular points on sensitivity control resistor 70. As in the other embodiments sensitivity control resistance 70 is arranged so that for equal increments of indicating member position, sensitivity is changed by equal ratios. In this step-wise adjustment the sensitivity control resistance 70 is made in discrete steps with a contact point 69 at each step. The component resistors 71 composing sensitivity control resistor 70 vary in resistance in such a way that movement of the contact arm 68 from one contact point 69 to another causes a logarithmic increase in the sensitivity of the system. The turning of knob 65 adjusts sensitivity in steps. For each change of position from one contact point to the next the sensitivity is changed by the same fixed ratio.

Turning particularly to Figure 5 it can be seen that both dials have indicia thereon. The inner dial is graduated in equal steps and the outer dial logarithmically. The outer dial has two cycles of logarithmic graduations. Within one cycle of these logarithmic graduations, the inner dial has graduations equal to the number of steps in the sensitivity control resistor 70 necessary to change the sensitivity by a factor of 10. In the apparatus shown the steps are 10° apart, each successive position changing the sensitivity by a factor 1.136, so that in 18 steps the sensitivity is changed by 10. The outer dial represents sensitivity and the inner dial the step position. If at position 1 there is one inch of pen travel for a standard radiation, at position 19 there are 10 inches of travel for the same incident radiation, and by lining up 1 on the inner dial with 1 on the outer dial, the sensitivity is then read directly on the outer dial for each step. If the standard radiation produces 7 inches of pen travel at position 3, 3 and 7 are lined up on the respective scales, and then the sensitivity is read directly on the logarithmic scale for each step position.

The calibrator has certain requirements. The scale must be logarithmic. The graduation on the logarithmic scale must be at least equal to the total change of sensitivity over all steps of the step switch and the length of one logarithmic cycle must be equal to the distance the indicating member moves in changing sensitivity by a factor of 10. Therefore, if P represents the number of steps and N represents the total change in sensitivity over P steps, then the logarithmic scale must have at least N logarithmic graduation. Further, the distance occupied by P steps must register with the distance occupied by N graduation in the logarithmic scale.

For increased facility, the preferred embodiment of this invention includes two logarithmic cycles on the outer circular dial, each cycle covering 180°. The sensitivity control is designed for a logarithmic change of sensitivity by a factor of 10 in 180°. The scale on the outer dial is then endless and may be continuously adjusted no matter what the range of sensitivity.

The forms of the invention illustrated in Figures 3 and 5 may be combined to utilize a step control in the linear application of Figure 3 or a continuous control in the circular application of Figure 5.

Further in the form of the invention illustrated in Figure 4, the control knob 46 may move contact point 48 linearly and the cam may move the indicating member 44 in the proper relationship thereto.

What has been described is the application of the invention to a well logging system. The invention also has other applications. It may be used in any system where sensitivity is adjusted by changing the position of a control element, such as, for example, a temperature control system in which the control element is actuated at a fixed level of output and in which it is desired to vary the controlled zone of temperature by adjusting the sensitivity.

It is therefore to be understood that this invention is not to be limited to the specific modifications described but is to be limited only by the following claims.

I claim:

1. In a system having a sensitivity control, a computer for changes in sensitivity comprising means to test the sensitivity of the system, indicating means comprising a logarithmically graduated scale and an indicating member for indicating the adjustment of the sensitivity control, means for providing a logarithmic relationship between the sensitivity as controlled by said sensitivity control and the position of the indicating means whereby equal increments of relative position of scale and indicating member correspond to equal ratios of sensitivity, and means for additionally shifting the relative position of scale and indicating member without simultaneously changing the adjustment of the sensitivity control to adjust the indication in accordance with the tested sensitivity.

2. In a system having a sensitivity control, a computer for changes in sensitivity comprising means to test the sensitivity of the system, an adjustable scale logarithmically graduated, an indicating means associated with said scale for indicating on said scale the adjustment of said sensitivity control, means for logarithmically coupling said indicating means to said sensitivity control with the same length cycle as said scale whereby equal increments of indicating means position correspond to equal ratios of sensitivity, and means for adjusting the position of the scale without simultaneously changing the adjustment of said indicating means and without simultaneously changing the adjustment of said sensitivity control in order to adjust the indication in accordance with tested sensitivity.

3. In a system having a sensitivity control, a computer for changes in sensitivity comprising means to test the sensitivity of the system, an adjustable scale logarithmically graduated, an indicating means associated with said scale for indicating on said scale the adjustment of said sensitivity control, means for logarithmically coupling said indicating means to said sensitivity control whereby equal increments of relative position of scale and indicating means correspond to equal ratios of sensitivity, and means for additionally shifting the relative position of scale and indicating means without simultaneously changing the sensitivity in order to adjust the indication in accordance with the tested sensitivity.

4. In a system having a sensitivity control, a computer for changes in sensitivity comprising means to test the sensitivity of the system, a circular adjustable scale graduated with two logarithmic cycles in 360 degrees, an indicating means adapted to rotate about an axis through the center of said scale for indicating on said scale the adjustment of said sensitivity control, means for logarithmically coupling said indicating means to said sensitivity control whereby equal increments of indicating means position correspond to equal ratios of sensitivity, and means for rotating said scale about its center without simultaneously changing the adjustment of said indicating means and without simultaneously changing the adjustment of said sensitivity control in order to adjust the indication in accordance with tested sensitivity.

5. In an electrical measuring system of which the sensitivity can be controlled by adjustment of a resistance, a computer for changes in sensitivity comprising means to test the sensitivity of the system, indicating means comprising a logarithmically graduated scale and an indicating member for indicating the sensitivity, means for providing a logarithmic relationship between the sensitivity as controlled by the resistance and the indication of the indicating means whereby equal increments of relative position of scale and indicating member correspond to equal ratios of sensitivity, and means for additionally shifting the relative position of scale and indicating member without simultaneously changing the sensitivity in order to adjust the indication in accordance with the tested sensitivity.

6. In an electrical measuring system having sensitivity directly proportional to a control resistance, a computer for changes in sensitivity comprising means to test the sensitivity of the system, a variable sensitivity control resistor, an adjustable scale logarithmically graduated, an indicating means associated with said scale for indicating sensitivity, means for logarithmically coupling said indicating means to said control resistor whereby equal increments of indicating means position correspond to equal ratios of sensitivity, and means for adjusting the position of the scale without simultaneously changing the adjustment of said indicating means and without simultaneously varying said control resistor in order to adjust the indication in accordance with tested sensitivity.

7. In an electrical measuring system having sensitivity controlled by the resistance in a sensitivity control circuit, a computer for changes in sensitivity comprising means to test the sensitivity of the system, a uniformly wound sensitivity control resistor, a movable contact adapted slidably to contact said resistor, means for electrically connecting said movable contact and one end of said resistor in said sensitivity control circuit to put the resistance therebetween in said sensitivity control circuit, an adjustable scale logarithmically graduated, an indicating means associated with said scale for indicating sensitivity, cam means for coupling said indicating means to said movable contact whereby equal increments of indicating means position correspond to equal ratios of sensitivity, and means for adjusting the position of the scale without simultaneously changing the adjustment of said indicating means and without simultaneously changing the adjustment of said movable contact in order to adjust the indication in accordance with tested sensitivity.

8. In an electrical measuring system having sensitivity directly proportional to the resistance in a sensitivity control circuit, a computer for changes in sensitivity comprising means to test the sensitivity of the system, a uniformly wound sensitivity control resistor, a movable contact adapted slidably to contact said resistor, means for electrically connecting said movable contact and one end of said resistor in said sensitivity control circuit to put the resistance therebetween in said sensitivity control circuit, an adjustable scale logarithmically graduated, an indicating means associated with said scale for indicating sensitivity, cam means for logarithmically coupling said indicating means to said movable contact whereby equal increments of indicating means position correspond to equal ratios of sensitivity, and means for adjusting the position of the scale without simultaneously changing the adjustment of said indicating means and without simultaneously changing the adjustment of said movable contact in order to adjust the indication in accordance with tested sensitivity.

9. In an electrical measuring system having sensitivity directly proportional to the resistance in a sensitivity control circuit, a computer for changes in sensitivity comprising means to test the sensitivity of the system, a logarithmically wound resistor, a movable contact engaging said resistor, means for electrically connecting said movable contact and one end of said resistor in said sensitivity control circuit to put the resistance therebetween in said sensitivity control circuit, an adjustable scale logarithmically graduated, an indicating means associated with said scale for indicating sensitivity, means for directly coupling said indicating means to said movable contact whereby equal increments of indicating means position correspond to equal ratios of sensitivity, and means for adjusting the position of the scale without simultaneously changing the adjustment of said indicating means and without simultaneously changing the adjustment of said movable contact in order to adjust indication in accordance with tested sensitivity.

10. In an electrical measuring system having sensitivity directly proportional to the resistance in a sensitivity control circuit, a computer for changes in sensitivity comprising means to test the sensitivity of the system, a series of resistors in the sensitivity control circuit graduated so that the addition of successive resistors increases total resistance in said circuit logarithmically, stationary electrical contact means between consecutive resistors in said series, movable electrical contact means adapted to contact any selected stationary electrical contact means, means for electrically connecting said movable contact means and one end of said series of resistors in said sensitivity control circuit to put the resistance therebetween in said sensitivity control circuit, an indicating means, means for directly coupling said indicating means to said movable contact means whereby equal increments of indicating means position correspond to equal ratios of sensitivity, an adjustable scale associated with said indicating means and logarithmically graduated with one cycle of graduations in the distance said indicating means moves relative to said scale for a 10 to 1 change in sensitivity, and means for adjusting the position of the scale without simultaneously changing the adjustment of said indicating means and without simultaneously changing the adjustment of said movable contact means in order to set the indication in accordance with tested sensitivity.

11. In an electrical measuring system having sensitivity directly proportional to the resistance in a sensitivity control circuit, a computer for changes in sensitivity comprising means to test the sensitivity of the system, a series of resistors in the sensitivity control circuit graduated so that the addition of each successive resistor changes the resistance in said circuit by a factor of $$\sqrt[18]{10}$$

stationary electrical contact means between consecutive resistors in said series and arranged 10 degrees apart on the arc of a circle, movable electrical contact means adapted to rotate about an axis through the center of said circle and thereby contact any selected stationary electrical contact means, means for electrically connecting said movable contact means and one end of said series of resistors in said sensitivity control circuit to put the resistance therebetween in said sensitivity control circuit, an indicating means adapted to rotate about said axis, means for directly coupling said indicating means to said movable contact whereby equal increments of indicating means position correspond to equal ratios of sensitivity, a circular adjustable scale associated with said indicating means and concentric therewith and logarithmically graduated with two cycles of graduations in 360 degrees, and means for adjusting the position of the scale without simultaneously changing the adjustment of said indicating means and without simultaneously changing the adjustment of said movable contact means in order to set the indication in accordance with tested sensitivity.

(References on following page)

References Cited in the file of this patent

UNITED STATES PATENTS

| | | | |
|---|---|---|---|
| 2,071,217 | Reich et al. | Feb. 16, | 1937 |
| 2,400,190 | Clark | May 14, | 1946 |
| 2,476,005 | Thomas | July 12, | 1949 |
| 2,476,318 | Nelson | July 19, | 1949 |
| 2,493,534 | Hawkins | Jan. 3, | 1950 |
| 2,610,226 | Klasse et al. | Sept. 9, | 1952 |
| 2,611,803 | Rumbaugh et al. | Sept. 23, | 1952 |
| 2,626,979 | Woods | Jan. 27, | 1953 |
| 2,656,498 | Goodwin | Oct. 20, | 1953 |

FOREIGN PATENTS

| | | | |
|---|---|---|---|
| 608,189 | Great Britain | Sept. 10, | 1948 |